United States Patent Office 3,418,376
Patented Dec. 24, 1968

3,418,376
PROCESS FOR THE DIRECT OXIDATION OF 2-AL-KYL-SUBSTITUTED-1-OLEFINS TO ALDEHYDES
Henry Harry Tan, Wilmington, Del., assignor to E. I. du Pont de Nemours and Company, Wilmington, Del., a corporation of Delaware
No Drawing. Filed June 21, 1965, Ser. No. 465,707
6 Claims. (Cl. 260—604)

ABSTRACT OF THE DISCLOSURE

A process for the direction oxidation of 2-alkyl-substituted-1-olefins to aldehydes which retain the original carbon skeleton of the olefin, which comprises treating the olefins with permaleic acid, preferably in an inert medium at a temperature below about 40° C.

---

The present invention relates to a novel, high yield process for the direct oxidation of 2-alkyl-substituted-1-olefins to aldehydes which retain the original carbon skeleton of the olefin. More particularly, this invention relates to a novel process for directly preparing 2-alkyl-substituted aldehydes in high yield from 2-alkyl-substituted-1-olefins by oxidation of the latter with permaleic acid.

Heretofore the preparation of aldehydes from 2-alkyl-substituted-1-olefins, as well as from unsubstituted 1-olefins, has been characterized by multistep processes involving the synthesis of one or more intermediate compounds which must be converted to the aldehyde in one or more separate and distinct reactions. Various oxidation processes using expensive catalysts and complex equipment often produce mixtures of products from 1-olefins, thus lowering the yield of any aldehyde and causing additional expense in the isolation thereof. Still other processes for oxidizing 2-alkyl-substiuted-1-olefins have been shown to give economically unattractive yields of 2-alkyl-substituted aldehydes in the mixtures of products obtained.

An example of the former type of process is that described in French 1,018,799 wherein molecular oxygen is employed with a metal or metal oxide catalyst to convert 2,4,4-trimethylpentene - 1 to 1 - neopentylacrolein which is later reduced to 2,4,4-trimethylpentanal with hydrogen over a Raney nickel catalyst. However, when molecular oxygen is reacted with 2,4,4-trimethylpentene-1 in the liquid phase process of U.S. 2,650,927, the olefin is oxidized to 1,2-epoxy-2,4,4-trimethylpentane. Methods for obtaining 2,4,4-trimethylpentanal from its 1,2-epoxide precursor are described in U.S. 2,686,205 and French 1,030,973. Nitrous oxide is shown in U.S. 2,636,898 to be a satisfactory reagent for converting propylene to propionaldehyde, but converts 2,4,4-trimethylpentene-1 to 1-methyl-1-neopentylcyclopropane and 4,4-dimethylpentan-2-one. Oxidations of unsubstituted 1-olefins by complex procedures such as those of U.S. 3,118,001, or 3,119,874, or 3,119,875 are shown to produce mixtures of aldehydes and ketones, such as methylethyl ketone and butyraldehyde from 1-butene.

When a peroxy acid is reacted with a 1-olefin, the principal product is usually the corresponding 1,2-epoxide which can be converted to the aldehyde in one or more subsequent steps. According to British 850,680, 2-methylpentene-1 is epoxidized with 35% peracetic acid to 1,2-epoxy-2-methylpentane. The latter is separated from unreacted olefin and is converted to 2-methylpentanal by concentrated phosphoric acid in a process operated under pressure at elevated temperatures and assisted by the injection of steam. A similar procedure, employing perbenzoic acid, is described in British 810,500. A three-step process described in British 824,839 for preparing 2-methylpentanal begins by epoxidizing 2-methylpentene-1 with performic acid, continues by hydrolyzing the 1-2-epoxide with caustic to the 1,2-diol, and is completed by distilling the diol from dilute mineral acid to form the aldehyde.

The diverse results which are observed when 2-alkyl-substituted-1-olefins are reacted with peroxy acids are well exemplified in J. Chem. Soc. 1948, 1328–1331, wherein the 1,2-epoxide is the only oxidation product reported from the reaction of perbenzoic acid with 2,4,4-trimethyl-pentene-1. When this olefin was treated with performic acid formed in situ, a quantity of 2,4,4-trimethylpentane-1,2-diol was isolated by distillation of the oily residue formed after neutralizing the reaction mixture. When other distillation fractions were hydrolyzed, a mixture of products was obtained, including some 2,4,4-trimethyl-pentanal. In one run, the reaction of 2,4,4-trimethyl-pentene-1 with performic acid prepared in situ produced a major portion of 2,5-dimethyl-2,5-dineopentenyl-1,4-dioxane, together with an 8.4% yield of 2,4,4-trimethyl-pentanal, and lesser amounts of other products. Peracetic acid is likewise reported to give 2,4,4-trimethylpentanal under some conditions, but not others. The results described in Tetrahedron, 17, 31–34, (1962), present a contrast in olefin oxidation by permaleic acid, since the 1,2-epoxide is obtained in high yield from 1-octene, but no epoxide was obtained from 1-methylcyclohexene. Perbenzoic acid, however, converts 1-methylcyclohexene to 1,2-epoxy-1-methylcyclohexene in 71% yield according to the process of Berichte der Deutschen Chemische Gesellschaft 56, 1083 (1923). U.S. 3,087,972 presents another instance wherein permaleic acid is contrasted in its effectiveness with other peroxy acids, since permaleic acid is described therein as an effective reagent of wide applicability for oxidizing aromatic amines to the corresponding nitro compounds, but peracetic acid and peroxytrifluoroacetic acid are said to exhibit serious shortcomings when employed in oxidations of this type, being ineffective to the point of even degrading the amine.

The present invention provides a novel process for preparing 2-alkyl-substituted aldehydes through the novel oxidation of 2-alkyl-substituted-1-olefins by permaleic acid. More particularly, there is provided a novel process for oxidizing 2,4,4-trimethylpentene-1 to 2,4,4-trimethyl-pentanal in high yield by use of permaleic acid. These and other provisions will become apparent from the specification and claims which follow.

It has now been discovered that 2-alkyl-substituted-1-olefins of the formula (I) 

can be readily oxidized under mild conditions with permaleic acid, without the need of added catalyst, to the corresponding 2-alkyl-substituted aldehydes of the formula (II) 

wherein for both I and II, $R_1$ represents an alkyl radical of from 1 to about 6 carbon atoms (e.g., methyl, ethyl, n-propyl, butyl, pentyl, hexyl) and $R_2$ represents an alkyl radical of from 1 to about 6 carbon atoms (e.g., methyl, ethyl, propyl, neopentyl, hexyl, and the like). It is believed that the reaction mechanism includes both an oxidation step and an isomerization step.

Typical of the 2-alkyl-substituted-1-olefins corresponding to Formula I which may be oxidized to the corresponding 2-alkyl-substituted aldehyde of Formula II according to the process of this invention are: isobutylene, 2-methylbutene-1, 2-methylpentane-1, 2,4,4-trimethylpentene-1, 2-ethylbutene-1, 2,3-dimethylbutene-1, 2-ethylpentene-1, 2-methylhexene-1, 2,3-dimethylpentene-1, 2,4-dimethylpentene - 1, 2-ethyl - 3 - methylbutene - 1, 2,3,3-trimethylbutene-1, 2-ethylhexene-1.

Among the 2-alkyl substituted aldehydes which may be prepared directly by the process of this invention may be named isobutyraldehyde, methylethylacetaldehyde, methyl - n - propylacetaldehyde, diethylacetaldehyde, methylisopropylacetaldehyde, methylneopentylacetaldehyde, and the like. The usefulness of these and similar aldehydes is well known, since they constitute useful intermediates from which the corresponding alcohols, carboxylic acids, α-hydroxycarboxylic acids, acetals, and the like may be prepared.

The oxidation reaction of this invention theoretically requires 1 mole of permaleic acid per mole of olefin, but an excess of permaleic acid, for example, from 5 to 100 mole percent, may be employed. The permaleic acid may be used directly or may be formed in situ by the slow addition of hydrogen peroxide to a solution of maleic acid or its anhydride, preferably maintained at a temperature of from −10° C. to 40° C. In the latter instance, a molar excess of hydrogen peroxide (100% basis) with respect to the olefin is preferred, but an even larger excess of the maleic acid or maleic anhydride is not deleterious to the reaction. A convenient procedure utilizes about 50 mole percent excess of hydrogen peroxide relative to the olefin.

The oxidation reaction, which may be run as a batch or continuous process, is advantageously performed at atmospheric pressure by slowly adding a solution of a 2-alkyl-substituted-1-olefin in an inert solvent to a stirred solution of permaleic acid, in the same solvent, which is at a temperature of about −10° C. to 40° C., preferably at about 10° C., and which may be prepared in situ as previously described. The resulting solution is stirred for about 2 hours while warming to room temperature, after which it is cooled and the precipitated maleic acid removed by filtration. The filtrate is washed, for example, with successive quantities of water, aqueous dilute alkali, dilute sodium bisulfite solution, and water, after which it is dried and later concentrated under vacuum. The aldehyde is then isolated from the residue by fractional distillation.

Useful inert solvents for this process include methylene chloride, chloroform, carbon tetrachloride, ethylene dichloride, benzene, toluene, xylene, chlorobenzene, and the like; preferably the solvents are those from which the maleic acid formed in the reaction is insoluble and may be removed by filtration.

Good yields of the 2-alkyl-substituted aldehydes derived from the corresponding 1-olefins, representative examples of which are mentioned above, have been obtained by this process. It is evident that the facile synthesis of 2-alkyl-substituted aldehydes in high yield by the process of the present invention is indeed unusual when the contradictory nature of the prior art is considered.

The present invention is illustrated by the following nonlimiting examples.

Example I

This example illustrates the preparation of 2,4,4-trimethylpentanal by the process of this invention.

Into a 2-liter, 3-necked flask, cooled in an ice bath, is stirred a mixture of 900 ml. of methylene chloride and 224 g. (2.28 moles) of maleic anhydride, followed by 61.2 g. (1.8 moles) of 90% hydrogen peroxide which is added in small portions. The resulting mixture is stirred for 2 hours at 15° C. A solution of 135 g. (1.2 moles) of 2,4,4-trimethylpentene-1 in an equal volume of methylene chloride is then slowly added to the oxidizing solution through a dropping funnel. After olefin addition is complete, the final mixture is allowed to warm to room temperature and stirring is continued at room temperature for 2 more hours. The reaction vessel is then cooled and the contents filtered by suction. The filtrate is washed successively with water, 10% sodium carbonate solution, very dilute sodium bisulfite solution, and again with water, after which it is dried over anhydrous magnesium sulfate. After the dried solution is filtered and the solvent removed under vacuum, the residue is taken up in cyclohexane. The cyclohexane solution is shaken successfully with a 10% solution of sodium carbonate and a saturated salt solution, after which it is dried over anhydrous magnesium sulfate. The drying agent is removed by filtration and the filtrate concentrated to give 202 g. of crude liquid product. The latter is distilled under reduced pressure to give 152 g. (50% yield) of 2,4,4-trimethylpentanal, B.P. 38°–39° C./11 mm. The infrared spectrum of this product is identical with that of 2,2,4-trimethylpentanal obtained through the isomerization of 1,2-epoxy-2,4,4-trimethylpentane.

Example II

This example illustrates the preparation of 2,4,4-trimethylpentanal on a larger scale by the process of this invention.

A stirred mixture of 500 g. (5.09 moles) of maleic anhydride and 1,800 ml. of methylene chloride is prepared in a 5-liter flask cooled in an ice bath. To this cooled mixture is slowly added 140 g. (4.12 moles) of 90% hydrogen peroxide over a period of 0.5 hr., the additions being made in small quantities through an eye dropper. The resulting system is stirred for 1 hr., with ice bath cooling being maintained. A solution of 350 g. (3.13 moles) of 2,4,4-trimethylpentene-1 in 400 ml. of methylene chloride is then added through a dropping funnel over a period of 4 hrs. The final reaction mixture is allowed to warm up to room temperature during the next 0.75 hr. The precipitated maleic acid is then filtered off and washed with methylene chloride; the washings are added to the original filtrate. The combined methylene chloride solution is shaken first with a 2% sodium bisulfite solution (2×250 ml.), then with a saturated salt solution (3×330 ml.). The organic layer is subsequently evaporated with slight external heating under a stream of nitrogen by means of a water aspirator, the solution temperature rising no higher than 50° C. The residue is cooled and taken up in 1,000 ml. of cyclohexane. The cyclohexane solution is shaken with 10% sodium carbonate solution (2×500 ml.), then with a saturated salt solution (1×250 ml.). The cyclohexane solution is dried for 0.5 hr. over anhydrous magnesium sulfate (150 g.), filtered from the drying agent, and the solvent removed under a stream of nitrogen by overnight evaporation with a water aspirator. There is thereby obtained 277 g. (2.16 moles) of 2,4,4-trimethylpentanal, 69% yield.

What is claimed is:

1. A method for preparing aldehydes of the formula

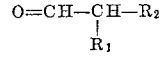

from olefins of the formula

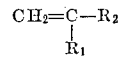

wherein $R_1$ and $R_2$ represent alkyl radicals of from one to six carbon atoms which comprises forming an oxidizing solution of permaleic acid in an inert medium at a temperature below about 40° C. and adding said olefins to the oxidizing solution.

2. The process of claim 1 wherein the permaleic acid is formed in situ.

3. The process of claim 1 wherein a molar excess of permaleic acid with respect to the olefin is employed.

4. A method for preparing 2,4,4-trimethylpentanal comprising forming an oxidizing solution of permaleic acid in an inert medium at a temperature below about 40° C. and adding 2,4,4-trimethylpentene-1 to the oxidizing solution.

5. The process of claim 4 wherein the reaction takes place in methylene chloride.

6. A method for preparing 2,4,4-trimethylpentanal comprising forming an oxidizing solution by combining maleic anhydride with hydrogen peroxide in an inert medium at a temperature below about 40° C. and adding 2,4,4-trimethylpentene-1 to the oxidizing solution, there being a molar excess of hydrogen peroxide incorporated with respect to the olefin.

No references cited.

LEON ZITVER, *Primary Examiner.*

R. H. LILES, *Assistant Examiner.*

U.S. Cl. X.R.

260—502